June 5, 1934.  F. D. CHENEY  1,961,335
PROCESS OF MANUFACTURING ORNAMENTAL MIRRORS
Filed Dec. 27, 1932
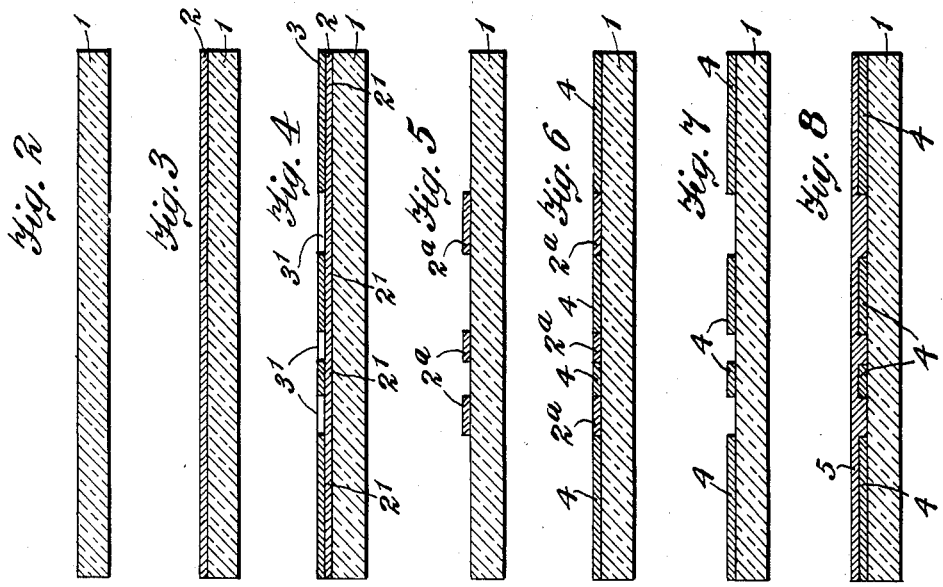
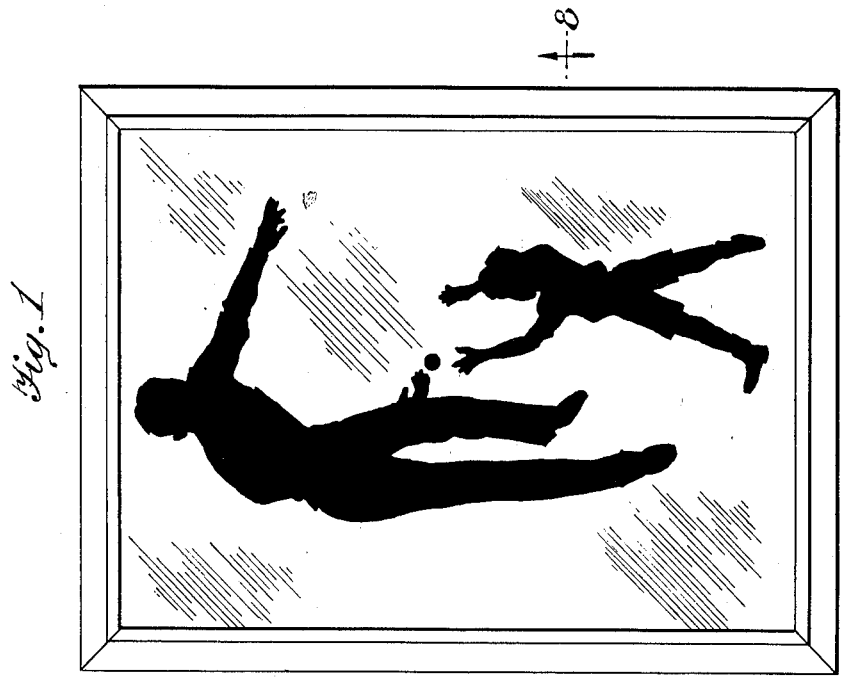
INVENTOR
Frank Dexter Cheney
BY
Joseph F. O'Brien
ATTORNEY Patented June 5, 1934

1,961,335

UNITED STATES PATENT OFFICE 1,961,335

PROCESS OF MANUFACTURING ORNAMENTAL MIRRORS

Frank Dexter Cheney, New York, N. Y.

Application December 27, 1932, Serial No. 649,012

2 Claims. (Cl. 41—22)

This invention relates to improvements in processes of manufacturing ornamental mirrors.

Certain processes of manufacturing ornamental mirrors or decorative reflective articles heretofore practiced provide for the initial covering or coating of one surface of a sheet of transparent material or glass with a metallic film either comprising a white metal such as silver or mercury, or a metal of a contrasting color, then applying over said metallic film a film of photo-sensitive material, such as an emulsion, portions of which are exposed to light and developed to impress a design therein and to cause one portion, as for example, the portion representing the design, to become insoluble and the remaining part to be soluble, whereupon the soluble portion superimposed on the metallic film is washed away with a suitable solvent, such as warm water, the reflective metallic film underlying said washed-away part is etched away by a suitable acid, and thereafter another layer or film of metal is applied of a contrasting color so as to bring out the design. The reflective metallic films employed for mirrors and particularly the silver solutions so employed, are easily ruptured or marred and it is extremely difficult in practicing processes such as hereinabove described to avoid marring of the metallic film or that portion thereof which is to be retained in the finished article, and injury often occurs by the penetration of the solvent through the metallic layer or through undercutting along the edge of the design by the etching acid, thus injuring that portion of the reflective film which should be completely protected.

One of the objects of this invention is to obviate and overcome the drawbacks and difficulties of such former processes by initially applying directly to the clear glass a layer of material in which the design is produced, and then applying the film of reflective material in juxtaposition thereto, and in the preferred embodiment of my invention, I apply directly to the clear glass a photo-sensitive material such as carbon tissue or an emulsion, in which a design or image is photographically impressed either before or after said film is so applied to the glass. This impression of an image or design may be accomplished in any well-known conventional manner as, for example, by superimposing over the film or layer of photo-sensitive material a pattern and then exposing the free portions to light, and such photo-sensitive layer may, either prior to or after application to the glass, be developed to cause the exposed parts to become insoluble and the balance thereof to remain soluble. I then wash away the soluble parts to leave the insoluble portion of the photo-sensitive film or carbon tissue alone on the glass. Thereafter, I pour or otherwise apply on the same surface of the glass a metallic reflective film such as silver, mercury, lead sulphite, gold, copper or the like, and thereafter remove the said insoluble portion of the photo-sensitive film or carbon tissue to leave the design or image comprising alternating areas of clear glass and reflective metallic film. I may now apply to the said surface over said metallic film and clear glass portions a suitable contrasting material such as fabric or paper, or a film preferably also composed of a reflective material such as paint or deposited metal, and where a second film of deposited metal is employed, I preferably provide a protective coating which may be composed of shellac or any other suitable coating material.

If it is desired to procure a contrasting effect by bringing into juxtaposition two metallic coating materials such as silver and lead or gold, I may vary the above process by first applying the lead or gold coating or the like, and thereafter applying the silver solution.

With these and other objects in view, the invention comprises the combination of members and arrangement of parts so combined as to coact and co-operate with each other in the performance of the functions and the accomplishment of the results herein contemplated, and comprises in one of its adaptations the species or preferred form illustrated in the accompanying drawing, in which:—

Fig. 1 is a front view of a mirror embodying my invention;

Fig. 2 is a cross-section of a plate of glass used in the production of said mirror;

Fig. 3 is a section similar to Fig. 2 showing the plate of glass with the photo-sensitive material applied thereto;

Fig. 4 is a similar cross-section of a plate of glass having superimposed thereon a photo-sensitive layer and a pattern for covering portions and permitting other portions to be subjected to light;

Fig. 5 is a similar sectional view of the plate of glass showing portions of the photo-sensitive material retained thereon and other portions washed away by a solvent;

Fig. 6 is a similar sectional view showing a metallic layer applied on the portions of the glass which have been freed from the photo-sensitive material;

Fig. 7 is a similar view showing the remaining reflective material after the insoluble photo-sensitive material has been removed to provide the design in the clear glass;

Fig. 8 is a similar sectional view showing a backing applied over the metallic layer and clear glass portions.

Referring now to this drawing which illustrates a preferred embodiment of my invention, 1 indicates a sheet of glass or other transparent material, on one surface of which is applied a layer 2 of photo-sensitive material, such as carbon-tissue or a suitable emulsion. In accordance with my invention, a design is suitably impressed into the layer of carbon-tissue or film of emulsion either before or after applying the said film to the glass. Such impressing of the design may be accomplished in any suitable conventional manner, and in the form of my invention illustrated, I apply over the photo-sensitive layer 2, a pattern 3 having the design represented by cut-out portions 3' and thereafter exposing the portions of the photo-sensitive layer beneath the cut-out portions to light and development so that the parts of the photo-sensitive layer representing the design become insoluble, and the balance of the photo-sensitive layer protected by the pattern remain soluble. The soluble portions 2' are then washed away leaving on the glass only the insoluble portions 2ª corresponding to the design of the pattern. I now apply to the uncovered portions of the glass either by pouring or in any other suitable manner, a layer or layers, or film or films 4 of reflective material such as silver, mercury, lead sulphite, gold or the like. I now remove the insoluble portions of the design 2a of the photo-sensitive film, thus producing a clear glass design which is delineated or edged about by the layer or film portions of reflective material.

It will be seen from the above that I have produced a design delineated by the coating or film of reflective material and comprising portions or sections of clear glass.

I now apply to the same surface over the said metallic layer and glass portions a suitable contrasting material such as fabric or paper, or a film preferably also composed of a reflective material such as paint or deposited metal, and where a second film of deposited metal is employed, I preferably provide a protective coating which may be composed of shellac or any other suitable coating material.

As illustrated, the film 5 may be composed of any suitable material such as a metallic paint and may be applied in any suitable manner. When a paint or the like is so applied, it will protect the first reflective layer and will bring out in the contrasting color of such coating the design theretofore comprising the clear glass.

Having described my invention, I claim:—

1. A process of producing ornamental mirrors which consists in applying to the clear surface of the glass a photosensitive film, exposing to light and developing portions of said film to impress a design therein in insoluble material, applying a solvent to remove the soluble part of said film, then applying over the surface from which the soluble film portion has been removed a reflecting coating, then removing the insoluble portions of the photosensitive material to provide a design make up of alternating areas of clear glass and reflective material and then covering said reflective coating and clear glass with a backing material of contrasting color.

2. A process of producing ornamental mirrors which consists in applying to the clear surface of the glass a photosensitive film, exposing to light and developing portions of said film to impress a design therein in insoluble material, applying a solvent to remove the soluble part of said film, then applying over the surface from which the soluble film portion has been removed a reflective coating, then removing the insoluble portions of the photosensitive material to provide a design made up of alternating areas of clear glass and reflective material and then covering said reflective coating and clear glass with a backing material of a color contrasting with the said film of reflective material.

FRANK DEXTER CHENEY.